United States Patent
Wu

(10) Patent No.: US 8,643,726 B2
(45) Date of Patent: Feb. 4, 2014

(54) TEST SYSTEM AND METHOD FOR TESTING CAMERA MODULE HAVING VOICE COIL MOTOR

(71) Applicant: Hon Hai Precision Industry Co., Ltd., New Taipei (TW)

(72) Inventor: Chiung-Sheng Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/863,398

(22) Filed: Apr. 16, 2013

(65) Prior Publication Data

US 2013/0300877 A1    Nov. 14, 2013

(30) Foreign Application Priority Data

May 14, 2012   (TW) .............................. 101117018 A

(51) Int. Cl.
*H04N 17/00*    (2006.01)

(52) U.S. Cl.
USPC .......................................... 348/187; 348/180

(58) Field of Classification Search
USPC .................................. 348/187, 180, 184, 345

IPC ............................................. H04N 17/00,17/02
See application file for complete search history.

(56) References Cited

U.S. PATENT DOCUMENTS

| 7,693,411 | B2 * | 4/2010 | Kwon et al. | .................. 396/127 |
| 8,023,815 | B2 * | 9/2011 | Yu et al. | .......................... 396/90 |
| 8,260,130 | B2 * | 9/2012 | Wang | ............................. 396/133 |
| 8,478,119 | B2 * | 7/2013 | Heo | ............................... 396/129 |

* cited by examiner

*Primary Examiner* — Trang U Tran
(74) *Attorney, Agent, or Firm* — Altis Law Group, Inc.

(57) ABSTRACT

A test system for testing a camera module is provided. The camera module includes a voice coil motor and a lens received in the voice coil motor. The test system includes a first focus activating unit, a second focus activating unit, and a timing unit. The first focus activating unit controls the voice coil motor to drive the lens to move from the initial position to the focusing position for achieving a first time focus and obtains a control signal. The second focus activating unit controls the voice coil motor to drive the lens to replace to the initial position and then move the lens from the initial position to the focusing position again for achieving a second time focus. The timing unit records a first moment when the lens is replaced to the initial position and a second moment when the lens is at the focusing position again.

11 Claims, 4 Drawing Sheets

TEST SYSTEM AND METHOD FOR TESTING CAMERA MODULE HAVING VOICE COIL MOTOR

BACKGROUND

1. Technical Field

The present disclosure relates to test systems and methods for testing camera modules and, particularly, to a test system and method for testing a camera module having a voice coil motor (VCM).

2. Description of the Related Art

Voice coil motors are widely employed as focusing drivers for camera modules in various kinds of electronic devices. Before a camera module having a VCM is assembled to an electronic device, it is tested to determine if a response time of the VCM is within an acceptable range. The response time is a period of time it takes for the VCM to drive a lens from an initial position to a focusing position. Currently, the response time is usually tested by a test system having a laser rangefinder. When testing, the VCM is activated to focus, the laser range-finder records a distance from the initial position to the focusing position, and the test system also simultaneously records the moment of the initial position and the moment of reaching the focusing position. Therefore, the response time which is equal to the moment of reaching focusing position minus the moment of the initial position, is obtained by the test system. However, sometimes the distance is inaccurately recorded because the VCM is so tiny the test result may be imprecise.

Therefore, it is desirable to provide a test system and method for testing a camera module having a VCM, which can overcome the above-mentioned problem.

DETAILED DESCRIPTION OF THE EMBODIMENTS

Figure 1:
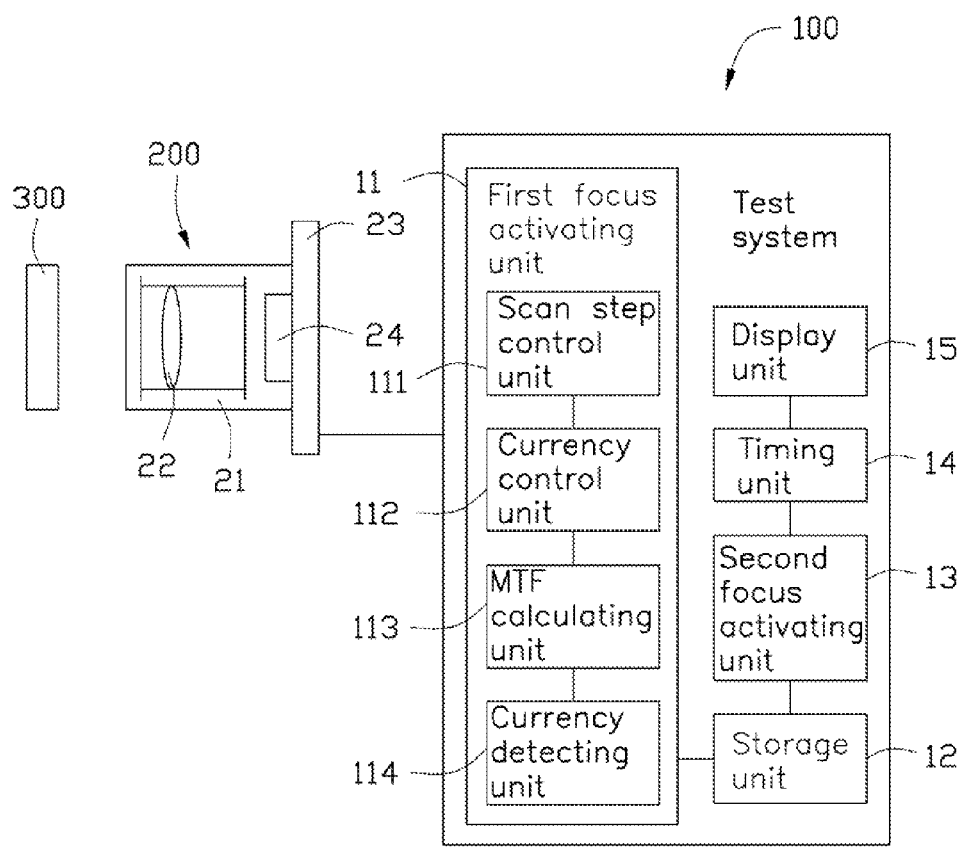
FIG. 1 is a functional block diagram of a test system for testing a camera module having a VCM, according to an exemplary embodiment.

FIG. 1 shows a test system 100 for testing a camera module 200 employing a VCM 21, according to an exemplary embodiment. The camera module 200 includes the VCM 21, at least one lens 22 received in the VCM 21 for focusing, a circuit board 23, and an image sensor 24 mounted on and electrically connected to the circuit board 23. The VCM 21 is used to drive the lens 22 to move among a number of scan positions to reach a focusing position, such that the image sensor 24 can capture a sharp image. In the embodiment, the image sensor 24 is a charge-coupled device (CCD) which coverts light signals to electric signals. The image sensor 24 captures images of a test subject 300 positioned in front of the camera module 200. A distance from the test subject 300 to the camera module 200 is less than a focus length of the camera module 200.

The test system 100 is electrically connected to the circuit board 23 of the camera module 200. The test system 100 includes a first focus activating unit 11, a storage unit 12, a second focus activating unit 13, a timing unit 14, and a display unit 15.

The first focus activating unit 11 controls the VCM 21 to drive the lens 22 from an initial position to the focusing position for achieving a first time focus. The first focus activating unit 11 obtains a control signal when the lens 22 is at the focusing position of the first time focus. The control signal is capable of controlling the VCM 21 to drive the lens 22 to the focusing position. The initial position is one of the scan positions which the camera module 200 focuses for an infinite distance subject (not shown). The focusing position is one of the scan positions which the camera module 200 focuses for the test subject 300. The storage unit 12 is connected to the first focus activating unit 11 and stores the control signal. The second focus activating unit 13 is connected to the storage unit 12. The second focus activating unit 13 fetches the control signal from the storage unit 12 and transmits the control signal to the VCM 21. The VCM 21 receives the control signal and drives the VCM 21 to replace the lens 22 to the initial position and then move the lens 22 from the initial position to the focusing position again for achieving a second time focus according to the control signal.

The timing unit 14 is connected to the second focus activating unit 13. The timing unit 14 records a first moment when the lens 22 is replaced to the initial position and a second moment when the lens 22 is at the focusing position again of the second time focus. The timing unit 14 also calculates a time difference between the second moment and the first moment (namely the second moment minus the first moment). The time difference is a response time of the VCM 21, which the lens 22 moving from the initial position to the focusing position.

In particular, the first focus activating unit 11 includes a scan step control unit 111, a currency control unit 112, an MTF calculating unit 113, and a currency detecting unit 114.

The VCM 21 is designed with a predetermined stroke. The predetermined stroke is a distance which the lens 22 can move within, for one example; the predetermined stroke is about 20 millimeters (mm). The predetermined stroke is divided into N number of scan steps. The scan steps represent the times it takes the lens 22 to move from a starting point to a finishing point of the predetermined stroke. In the embodiment, N is a positive integer, for one example N is 1024.

Figure 2:
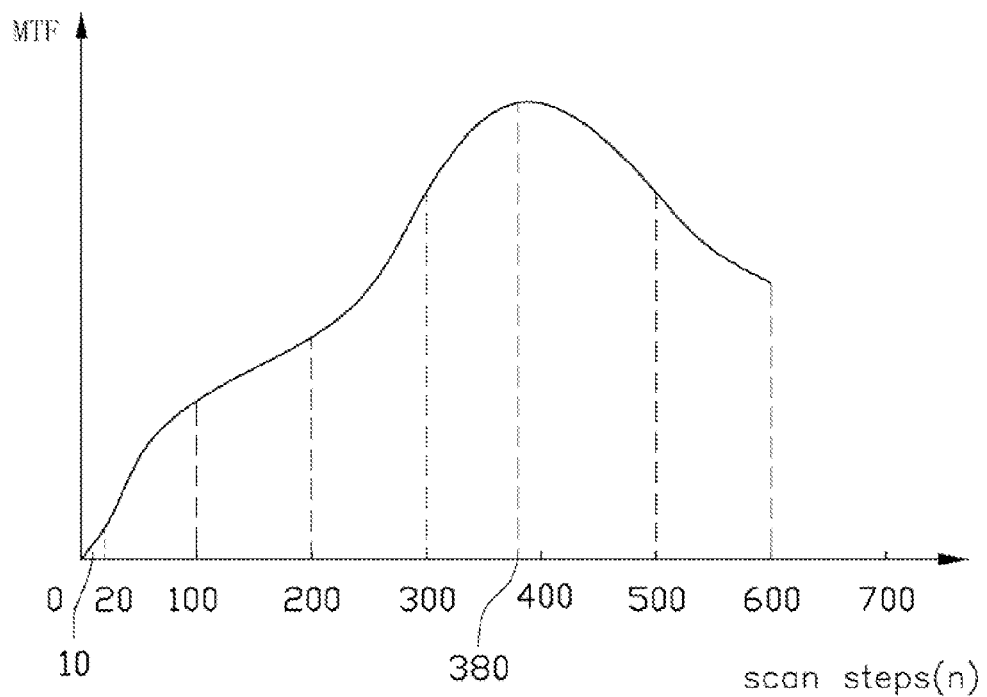
FIG. 2 is a graph showing a relationship between a variation of scan steps and a variation of modular transfer function (MTF) values when the test system testing the camera module of FIG. 1.

As shown in FIGS. 1 and 2, when testing the camera module 200, the test subject 300 is positioned in front of the camera module 200 and a subject distance is predetermined, for one example, the subject distance is 10 centimeters (cm). The scan step control unit 111 presets the number of scan steps for the VCM 21 when the VCM 21 drives the lens 22 to each of the scan positions. For example, when the lens 22 is at the initial position, the number of scan steps is zero (FIG. 2). The scan step control unit 111 also gradually increases the number of scan steps of the VCM 21 by a step increment when the camera module 200 is focusing. For one example, the step increment is ten, and as shown in FIG. 2, the scan positions are sequentially distributed as follows: zero scan step (the initial position), ten scan steps (a first scan position), twenty scan steps (a second scan position), and so on.

The currency control unit 112 is connected to the scan step control unit 111 and provides different driving currencies to the VCM 21, such that the VCM 21 drives the lens 22 to a corresponding scan position by a corresponding driving currency. The VCM 21 drives the lens 22 to the focusing position for achieving the first time focus by a certain driving currency.

The MTF calculating unit 113 is connected to the currency control unit 112. The MTF calculating unit 113 calculates MTF values for each scan position to form a curve of MTF values (FIG. 2) and determines a peak of the curve. The MTF calculating unit 113 also determines the peak of the curve as the focusing position. As shown in FIG. 2, the peak corresponding to the number of scan steps is three hundreds and eighty and is determined as the focusing position by the MTF calculating unit 113.

Figure 3:
FIG. 3 is a graph showing a relationship between a variation of driving currencies and the variation of MTF values when the test system testing the camera module of FIG. 1.

The currency detecting unit 114 is connected to the MTF calculating unit 113 and detects a value of a driving currency when the lens 22 is at the focusing position. In the embodiment, the control signal is the value of the drive currency when the lens 22 is at the focusing position. FIG. 3 shows that the value of the drive currency, when the lens 22 is at the focusing position (the number of scan steps is three hundred and eighty), is about 38.356 milliamperes, and is detected by the MTF calculating unit 113.

The storage unit 12 is connected to the currency detecting unit 114 and stores the control signal, i.e., the value of the driving currency when the lens 22 is at the focusing position.

The second focus activating unit 13 fetches the value of the drive currency when the lens 22 is at the focusing position from the storage unit 12 and transmits the value of the drive currency when the lens 22 is at the focusing position to the VCM 21. The VCM 21 receives the value of the drive currency when the lens 22 is at the focusing position and drives the lens 22 replace to the initial position, and then move the lens 22 from the initial position to the focusing position again for achieving the second time focus, according to the value of the drive currency when the lens 22 is at the focusing position.

The timing unit 14 records the first moment when the lens 22 replaces to the initial position and the second moment when the lens 22 moves to the focusing position again for achieving the second time focus. The timing unit 14 also calculates the time difference between the second moment and the first moment (namely the second moment minus the first moment). For example, in the testing, the first moment is 21331734 milliseconds and the second moment is 21332234 milliseconds. The time difference between the second moment and the first moment is equal to 500 milliseconds (namely 21332234 milliseconds minus 21331734 milliseconds). The time difference (500 milliseconds) is the response time of the VCM 21, which the lens 22 moves from the initial position to the focusing position. Therefore, the response time is accurately obtained.

The display unit 15 displays the time difference (500 milliseconds). In alternative embodiments, the display unit 15 also displays the first time moment, the second time moment, and the value of the drive currency when the lens 22 is at the focusing position.

Figure 4:
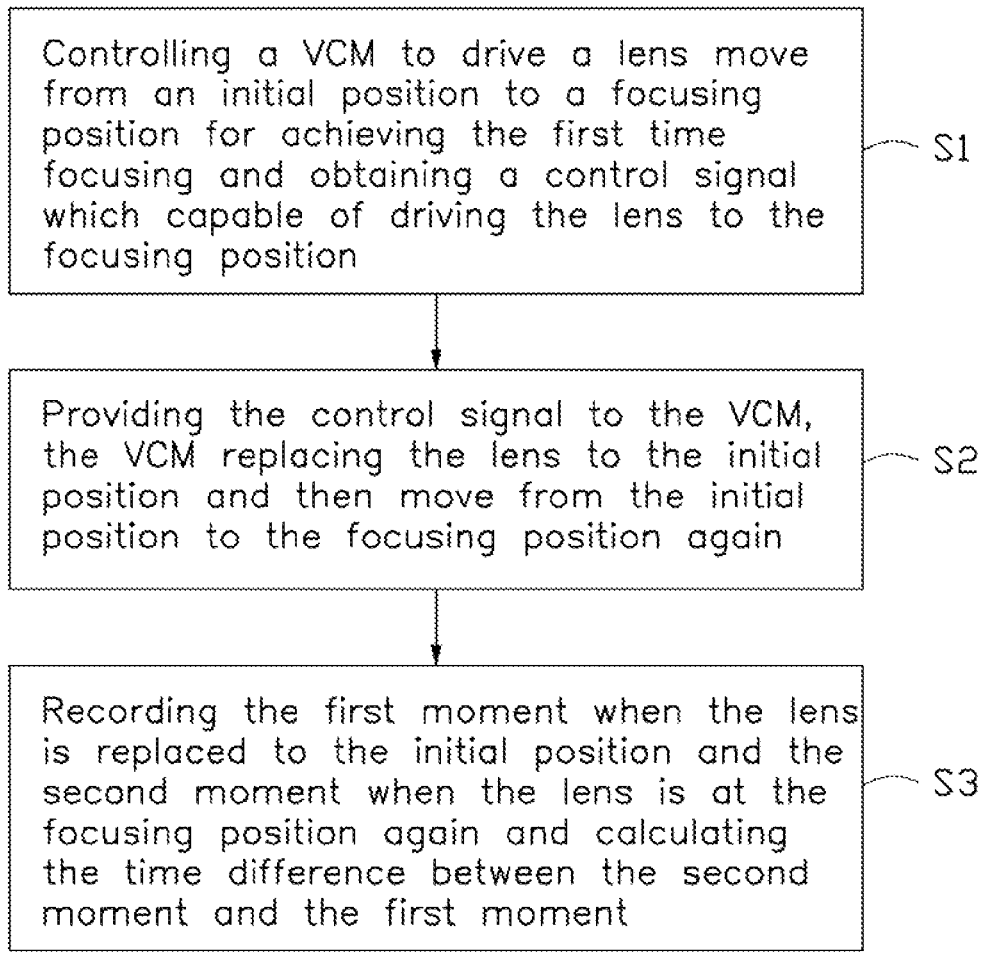
FIG. 4 is a flowchart of a test method for testing a camera module having a VCM, according to an exemplary embodiment.

FIG. 4 shows a flowchart of a method for testing the camera module 200 employing the VCM 21, according to an exemplary embodiment. The test method includes the following steps:

S1: controlling the VCM 21 to drive the lens 21 move from the initial position to the focusing position for achieving the first time focusing, and obtaining a control signal which is capable of driving the lens 21 to the focusing position. In this step, the control signal is the value of the drive currency when the lens 22 is at the focusing position.

S2: providing the control signal to the VCM 21, the VCM 21 replacing the lens 21 to the initial position and then move the lens 21 from the initial position to the focusing position again for the achieving the second time focusing.

S3: recording the first moment when the lens 22 is replaced to the initial position and the second moment when the lens 22 is at the focusing position again and calculating the time difference between the second moment and the first moment to obtain the response time of the VCM 21. In this step, the time difference between the second moment and the first moment is the response time.

In alternative embodiments, the test method further includes a step of storing the control signal by the storage unit 12 between step S1 and step S2.

In alternative embodiments, the test method further includes a step of displaying the response time by the display unit 15 after step S3.

It is also to be understood that above description and any claims drawn to a method may include some indication in reference to certain steps. However, the indication used is only to be viewed for identification purposes and not as a suggestion as to an order for the steps.

What is claimed is:

1. A test system for testing a camera module, the camera module comprising a voice coil motor and a lens received in the voice coil motor, the voice coil motor being capable of driving the lens move among a number of scan positions for focusing, and the lens be capable of moving from an initial position to a focusing position of the scan positions in a response time; the test system comprising:
   a first focus activating unit configured for controlling the voice coil motor to drive the lens to move from the initial position to the focusing position for achieving a first time focus and obtaining a control signal when the lens is at the focusing position of the first time focusing;
   a second focus activating unit configured for controlling the voice coil motor to drive the lens to replace to the initial position and then move the lens from the initial position to the focusing position again for achieving a second time focus according to the control signal; and
   a timing unit configured for recording a first moment when the lens is replaced to the initial position and a second moment when the lens is at the focusing position again of the second time focus.

2. The test system as claimed in claim 1, wherein the timing unit calculates a time difference between the second moment and the first moment, and the time difference is the response time of the voice coil motor.

3. The test system as claimed in claim 2, wherein the test system comprises a display unit for display the response time.

4. The test system as claimed in claim 1, wherein the test system comprises a storage unit for storing the control signal.

5. The test system as claimed in claim 1, wherein the first focus activating unit comprises a scan step control unit, a currency control unit, a modular transfer function calculating unit, and a currency detecting unit; the scan step control unit presets the number of scan steps for the voice coil motor corresponding to the scan positions; the currency control unit provides different driving currencies to the voice coil motor, the voice coil motor drives the lens to a corresponding scan position by a corresponding driving currency; the modular transfer function calculating unit calculates modular transfer function values for each scan position to form a curve, determines a peak of the curve, and determines the peak of the curve as the focusing position; and the currency detecting unit detects a value of a driving currency when the lens is at the focusing position.

6. The test system as claimed in claim 5, wherein the scan step control unit gradually increases the number of scan steps of the voice coil motor by a step increment when the camera module is focusing.

7. The test system as claimed in claim 5, wherein the control signal is the value of the drive currency when the lens is at the focusing position.

8. A method for testing a camera module, the camera module comprising a voice coil motor and a lens received in the voice coil motor, the voice coil motor being capable of driving the lens move among a number of scan positions for focusing, and the lens be capable of moving from an initial position to a focusing position of the scan positions in a response time; the method comprising:

controlling the voice coil motor to drive the lens to move from the initial position to the focusing position for achieving the first time focusing;

obtaining a control signal which is capable of driving the lens to the focusing position;

providing the control signal to the voice coil motor;

controlling the voice coil motor to replace the lens to the initial position;

recording the first moment when the lens is replaced to the initial position;

controlling the voice coil motor to move the lens from the initial position to the focusing position again for the achieving the second time focusing under the control signal; and recording the second moment when the lens is at the focusing position again of the second time focusing.

9. The method as claimed in claim 8, comprising calculating a time difference between the second moment and the first moment, wherein the time difference is the response time of the voice coil motor.

10. The method as claimed in claim 8, comprising storing the control signal.

11. The method as claimed in claim 8, comprising displaying the time difference.

* * * * *